Figure 1:
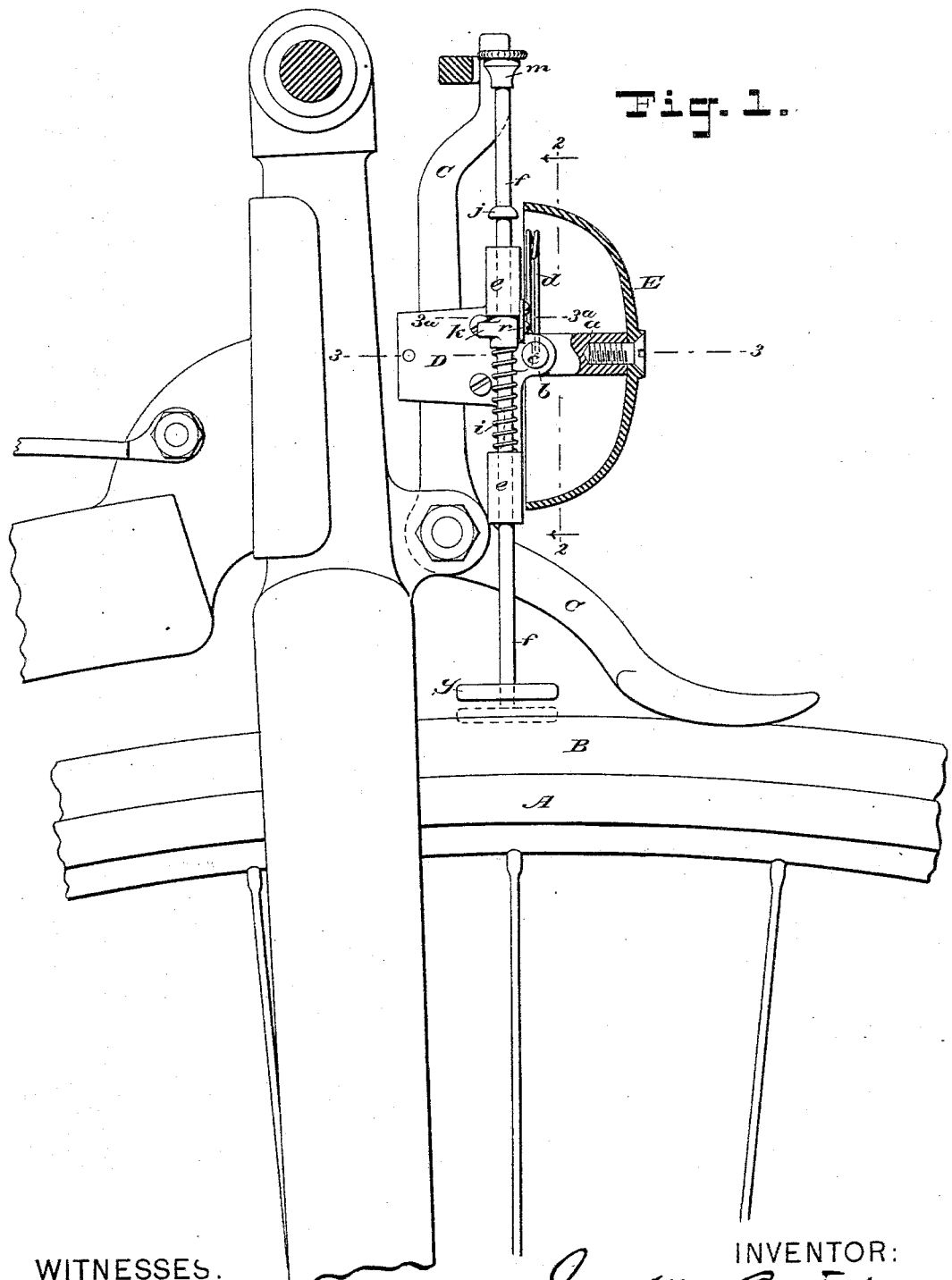

(No Model.) 3 Sheets—Sheet 2.
J. BUTCHER.
BICYCLE BELL.
No. 300,568. Patented June 17, 1884.
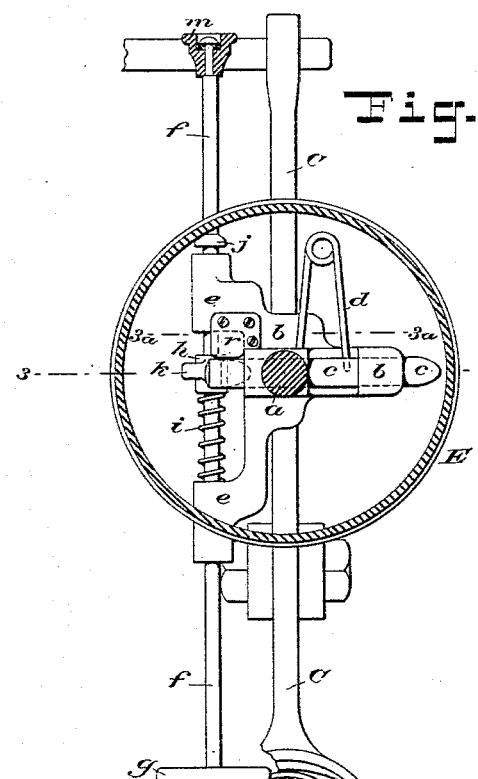
Fig. 2.
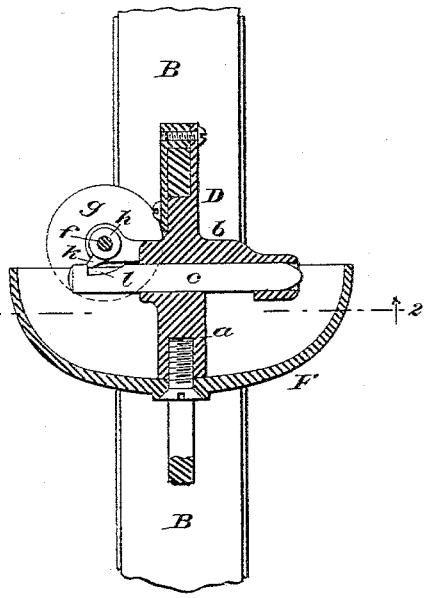
Fig. 3.
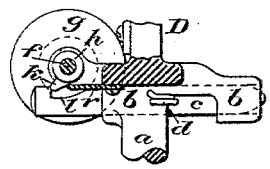
Fig. 3a.
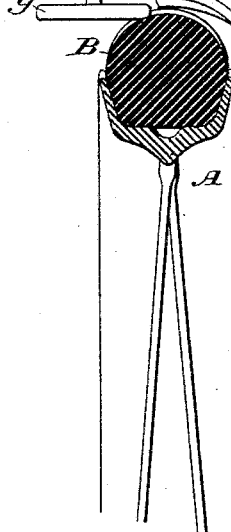
WITNESSES:
Geo. H. Fraser.
E. B. Bolton
INVENTOR:
Joseph Butcher
By his Attorneys,
Burke, Fraser & Connett (No Model.) 3 Sheets—Sheet 3.
J. BUTCHER.
BICYCLE BELL.
No. 300,568. Patented June 17, 1884.
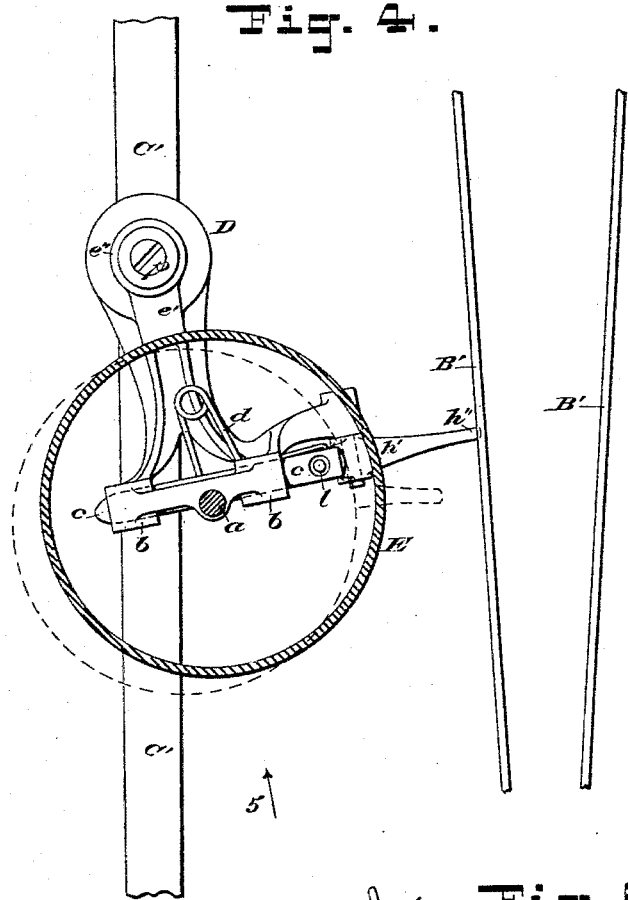
Fig. 4.
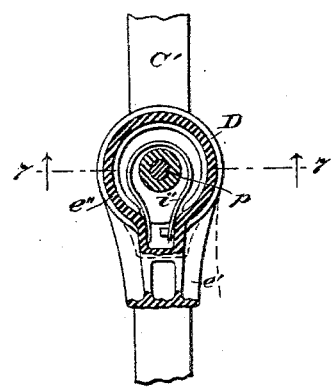
Fig. 6.
Fig. 7.
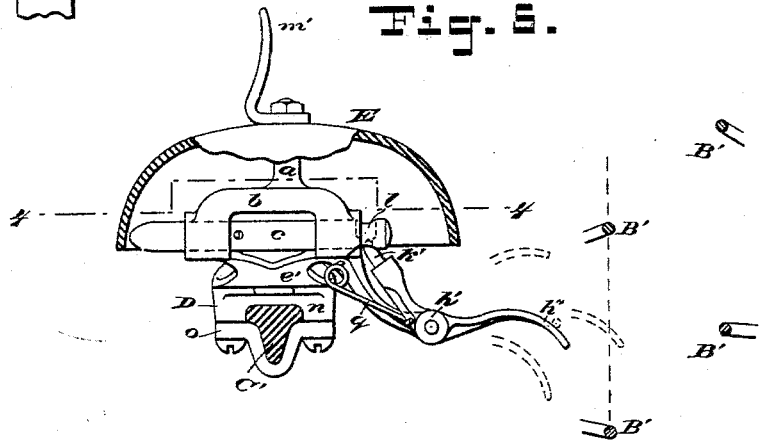
Fig. 5.
WITNESSES:
Geo. H. Fraser.
E. B. Bolton.
INVENTOR:
Joseph Butcher
By his Attorneys,
Burke, Fraser & Connett

UNITED STATES PATENT OFFICE.

JOSEPH BUTCHER, OF BOSTON, MASSACHUSETTS.

BICYCLE-BELL.

SPECIFICATION forming part of Letters Patent No. 300,568, dated June 17, 1884.

Application filed March 17, 1884. (No model.)

*To all whom it may concern:*

Be it known that I, JOSEPH BUTCHER, a citizen of the United States, and a resident of Boston, Massachusetts, have invented certain Improvements in Alarm-Bells for Bicycles and Similar Wheel-Vehicles, of which the following is a specification.

My invention relates to bells for bicycles, tricycles, &c., which are operated or sounded through the medium of the rotating wheel of the vehicle, the purpose of which is to enable the rider to sound an alarm, and thus indicate his approach.

The principal novel features of my invention consist in the peculiar mounting of the hammer or bolt which strikes the bell, and in the means employed for actuating said hammer or bolt through the medium of the wheel of the vehicle or some part thereof.

In the drawings which serve to illustrate my invention, Figure 1 is a side elevation of the bell and the adjacent parts of a bicycle on which it is mounted, the gong itself being in section, the better to show the working parts. Fig. 2 is a front elevation of the same, the gong itself being in section taken on line 2 2 in Fig. 1. Fig. 3 is a horizontal section or sectional plan taken on line 3 3 in Figs. 1 and 2. Fig. 3ᵃ is a horizontal section or sectional plan taken on line 3ᵃ 3ᵃ in Figs. 1 and 2. Figs. 4, 5, 6, and 7 illustrate the application of my bell to a tricycle, Fig. 4 being a plan with the gong in section on line 4 4 in Fig. 5, and Fig. 5 a front elevation with a part of the gong broken away. Fig. 6 is a sectional plan of the spring-mounting for the bell, the spring-case being in section on line 6 6 in Fig. 7; and Fig. 7 is a cross-section on line 7 7 in Fig. 6.

Referring to Figs. 1, 2, and 3, A represents the wheel of a bicycle, B its rubber tire, and C the usual brake. D is a clamp by which the bell is secured to the brake, and E the gong, mounted on a stem, $a$, which projects from the socket-piece $b$ in which the striking-bolt and operating shaft or rod are mounted. The parts $a$ and $b$ are formed in one piece with the clamp D. The striking-bolt $c$ is preferably cylindrical, and is mounted in a socket in $b$, being arranged with its axis substantially parallel to the face of the gong. The spring $d$, which throws or shoots the bolt, is secured at one end to the socket-piece, and its free end engages a hole in the bolt or is connected in some convenient way therewith. The spring is so set that when not under tension it holds the bolt (see Fig. 2) with its striking end a little way off from the gong. The result of this arrangement is that when the bolt is drawn back and let go the spring permits it to strike the gong, and then instantly retract it far enough to permit the gong to vibrate freely without touching the bolt. Consequently my construction avoids all the unpleasant rattling so often found in bells as ordinarily constructed, and I also obtain a clear tone from the gong.

I will now describe the mechanism for operating the bolt and ringing the bell.

In bearings $e\ e$ on the socket-piece $b$, I mount a rod or shaft, $f$, which rotates on a substantially vertical axis, and on the lower end of said shaft is fixed a wheel or disk, $g$, which may be brought into contact with the tire B on the bicycle-wheel by pushing said shaft down to the position shown in Fig. 2. On the shaft $f$ is secured a collar, $h$, and between this collar and the lower bearing $e$ is arranged a spiral spring, $i$, which embraces said shaft. The function of this spring is to keep the shaft $f$ raised and the disk $g$ out of contact with the tire on the wheel. The upward movement of the shaft $f$ is limited by the contact of collar $h$ with its upper bearing $e$, and its downward movement is limited by a collar, $j$, on $f$. On the collar $h$ is a claw or tappet, $k$, which, when the shaft $f$ is pushed down until disk $g$ is in contact with the tire, is brought opposite to, or on the same level with, the rear end of the bolt $c$, and as the disk $g$ revolves by reason of the contact of its periphery with the tire, this claw $k$ is caused to engage (see Fig. 3) a recess, $l$, in the bolt near its end and draw the bolt back. The continuous revolution of the shaft causes the claw to draw out of recess $l$ when the freed bolt is shot out by spring $d$ and strikes the gong. As long as the shaft F continues to revolve this striking operation will be repeated, and will occur at each revolution. On the top of shaft $f$ is mounted a pressure-button, $m$, (in section in Fig. 2,) in which the shaft turns freely. The rider presses down on this button in order to set the bell to ringing, and as it does not rotate with shaft $f$ there is no disagreeable rubbing or friction on his fingers. As long as the pressure continues and wheel A revolves, the bell will continue to ring; but when the pressure is removed the spring $d$ lifts the disk $g$ out of contact with the tire, and rotation of shaft $f$ ceases. The claw $k$ is also lifted above the level of the bolt. As the claw $k$ rises above the level of the bolt $c$, it might stand out over it and catch on it when pressed down. To avoid this I mount or form a shield, $r$, on the socket-piece $b$, (best shown in Fig. 3ª,) which prevents the claw from turning out over the bolt when said claw stands raised, as in Fig. 1. This or some similar device is the more important, as the rider cannot readily turn the shaft $f$, owing to the button $m$ being loosely mounted thereon, and if claw $k$ should catch on the bolt the disk $g$ could not be brought into contact with the tire.

The clamp D enables the bell to be adjusted up or down to adapt the operative mechanism to the wheel of the bicycle.

The disk $g$ may be made to contact with the metal of the wheel-rim instead of the tire.

I may of course employ my bell on other vehicles than the bicycle, by mounting it on some part over the wheel; but in tricycles, for example, I prefer to employ the construction shown in the last four figures of the drawings. In these the gong E, the bolt $c$, and its spring $d$ are mounted and arranged to operate the same as in the construction described. The bell is mounted on the frame C' of the tricycle, and is adapted to be swung laterally on its bearing until an operating-lever, $h'$, borne by it, engages a spoke, B', of the wheel, when the said lever is caused to ring the bell.

The clamp D comprises a stud-plate, $n$, and stirrup $o$. These are best illustrated in Fig. 7. The socket-piece $b$ is on the end of an arm, $e'$, on the other end of which is a cap-bearing, $e''$, mounted on the stud on plate $n$, and held in place by a screw, $p$. Within the hollow of the clamp D is arranged a spring, $i'$, one end of which is fixed to the stud-plate $n$, and the free end of which presses against the inner face of $e'$ in such a manner as to exert a lateral pressure toward the left in Figs. 4 and 6. When the bell is swung or pressed to one side, as in Fig. 4, the tail $h''$ of lever $h'$ is brought into the path of the spokes B', which depress it. The other end, $k'$, of the lever engages a hole or recess, $l$, in the bolt $c$, and draws the latter back; and when the spoke passes the tail of the lever, spring $d$ shoots the bolt and sounds the gong. In order to prevent breakage of the parts, should the tricycle-wheel be turned back while the tail of the lever $h'$ is in the path of the spokes, I construct the lever so that it may swing back freely, and provide it with a weak spring, $q$, to bring it back to the normal position after the spoke has passed. The lever $h'$ is pivoted on an arm projecting from the socket-piece $b$, and the spring $q$ is mounted on some part of said socket-piece.

On the bell is fixed a suitable thumb-piece, $m'$, whereby it is pressed over toward the wheel, and when the bell is released the spring $i'$ returns it to its normal position. (Represented in Fig. 5.)

The spokes $b'$ are represented in cross-section in Fig. 5, and the dotted lines in this figure show the several positions the tail of lever $h'$ may assume.

Having thus described my invention, I claim—

1. An alarm-bell for a bicycle or other wheel-vehicle, having a striking-bolt arranged to slide longitudinally in a socket, as described, and said bolt provided with an operating-spring adapted to shoot the bolt and then slightly retract it, substantially as and for the purposes set forth.

2. In an alarm-bell for bicycles or other wheel-vehicles, the combination, with the striking-bolt and its spring, constructed and arranged substantially as described, of means, substantially as described, for actuating said striking-bolt, said means comprising a claw on a rotatively-mounted shaft, adapted to catch and draw back the said bolt, and a disk fixed on the said shaft, adapted to be brought into contact with the tire of the vehicle-wheel at will to effect the rotation of the disk and shaft, as set forth.

3. The mechanism for causing the rotating wheel of the vehicle to actuate the striking-bolt, comprising the combination of the rotatively-mounted shaft $f$, the disk $g$, fixed thereon, the collar $h$, fixed on said shaft and provided with a claw, $k$, the spring $i$, for raising or retracting shaft $f$, the sliding bolt $c$, provided with a recess, $l$, adapted to be engaged by claw $k$, and the spring $d$ for shooting the bolt, all arranged to operate substantially as set forth.

4. The shaft $f$, provided with a disk, $g$, fixed to its lower end, and the button $m$, mounted rotatively on its top, in combination with the collar $h$ and its claw, fixed on shaft $f$ in position for the claw to engage the striking-bolt when said shaft is depressed, the spring $i$, arranged to lift or retract shaft $f$, and the striking-bolt and its spring, all arranged to operate substantially as set forth.

5. The combination, with the shaft $f$, provided with the disk $g$, button $m$, claw $k$, and spring $i$, and with the recessed bolt $c$, of the shield $r$, mounted on the socket-piece $b$, substantially as and for the purposes set forth.

In witness whereof I have hereunto signed my name in the presence of two subscribing witnesses.

JOSEPH BUTCHER.

Witnesses:
JOHN HASKELL BUTLER,
LOUIS W. DARLING.